J. W. KIDWELL.
BELT FASTENER.
APPLICATION FILED DEC. 10, 1908.

934,321.

Patented Sept. 14, 1909.

Inventor
J. W. Kidwell.

UNITED STATES PATENT OFFICE.

JOHN W. KIDWELL, OF RICHMOND, VIRGINIA.

BELT-FASTENER.

934,321.

Specification of Letters Patent. Patented Sept. 14, 1909.

Application filed December 10, 1908. Serial No. 466,825.

*To all whom it may concern:*

Be it known that I, JOHN W. KIDWELL, a citizen of the United States, residing at Richmond, in the county of Henrico and State of Virginia, have invented certain new and useful Improvements in Belt-Fasteners, of which the following is a specification.

This invention comprehends certain new and useful improvements in fasteners for driving or power belts and the invention has for its primary object a simple, durable and efficient construction of belt fastening device which will easily accommodate itself to cylindrical or oval pulleys, thereby serving a wide range of usefulness.

With this and other objects in view as will more fully appear as the description proceeds, the invention consists in certain constructions and arrangements of the parts as I shall hereinafter fully describe and claim.

Figure 1:
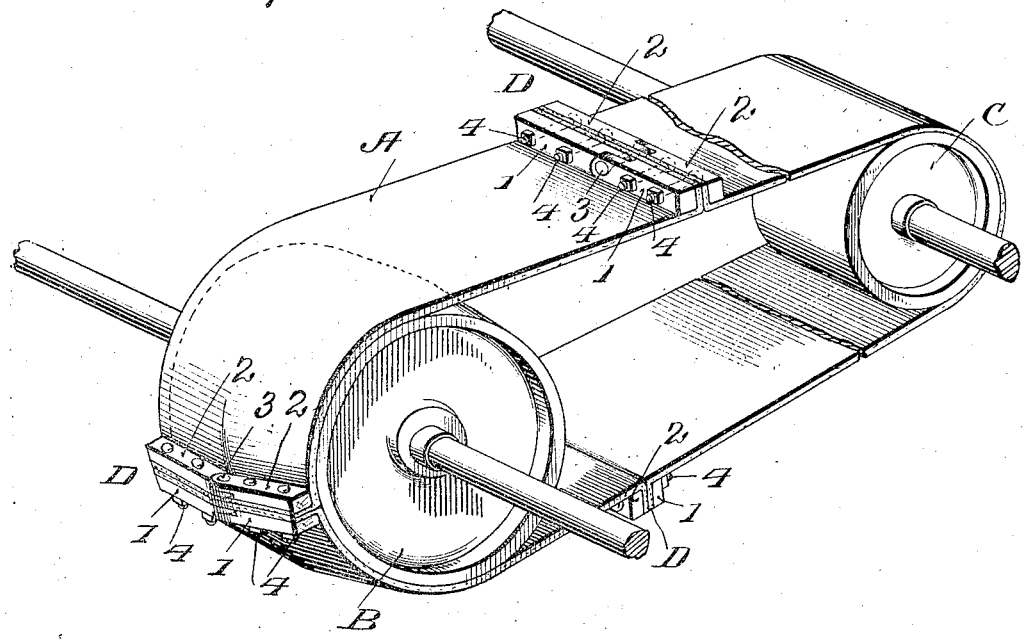
Figure 2:
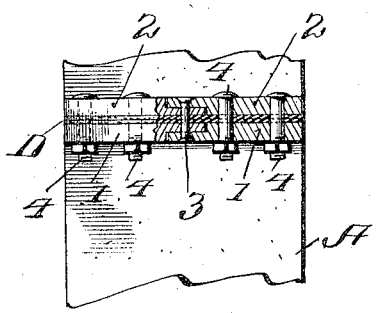

For a full understanding of the invention, reference is to be had to the following description and accompanying drawings, in which:

Figure 1 is a perspective view of a belt equipped with the improvements of my invention and Fig. 2 is a detail view of the belt fastener attached.

Corresponding and like parts are referred to in the following description and indicated in all the views of the drawings by the same reference characters.

Referring to the drawing, the letter A designates a driving belt of any desired length and width.

B and C designate pulleys around which the belt is mounted to travel, and D designates one of my improved belt fasteners.

My improved fastening device comprises four plates or bars, 1, 1 and 2, 2, arranged in horizontal pairs with a rivet 3 or similar fastening means passing therethrough. The ends of the belt are secured between the opposing pairs 1 and 2 by means of bolts 4 passing therethrough or by equivalent fastening devices. It will thus be noted that the fastener is composed of hinged sections that will easily accommodate themselves to the particular shape of the periphery of the pulley or belt wheel over which they pass in the travel of the belt or driving band. For example, the pulley B is shown as an oval pulley, while the pulley C is a right cylinder. As the belt fasteners reach the oval periphery of the pulley B the sections will become angularly disposed to each other as clearly illustrated in the drawings, and the belt will thereby be permitted to accommodate itself closely to the periphery of the pulley.

From the foregoing description in connection with the accompanying drawing, it will be seen that I have provided a very simple construction of belt fastening device in which the hinged sections permit the belt to lie closely against the peripheries of pulleys of different shapes, the usefulness of the belt fastener being thereby greatly increased.

Having thus described the invention, what is claimed as new is:

As a new article of manufacture, the herein-described improved belt fastener comprising two pairs of bars, arranged parallel to each other, and a rivet passing through the adjacent ends of all of the bars, and pivotally connecting the bars together at the middle of the fastener, whereby to produce a fastener of two hinged sections.

In testimony whereof I affix my signature in presence of two witnesses.

JOHN W. KIDWELL. [L. S.]

Witnesses:
 MARSHALL P. GORDON,
 EDWARD L. MCLELLAND.